United States Patent
Takahashi

(10) Patent No.: US 9,660,491 B2
(45) Date of Patent: May 23, 2017

(54) ROTOR FOR ROTATING ELECTRIC MACHINE

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 660 days.

(21) Appl. No.: 14/069,762

(22) Filed: Nov. 1, 2013

(65) Prior Publication Data
US 2014/0125182 A1    May 8, 2014

(30) Foreign Application Priority Data
Nov. 2, 2012  (JP) ................................. 2012-242820

(51) Int. Cl.
*H02K 1/27* (2006.01)
(52) U.S. Cl.
CPC ........... *H02K 1/2766* (2013.01); *H02K 1/276* (2013.01); *H02K 2213/03* (2013.01)
(58) Field of Classification Search
CPC ... H02K 1/276; H02K 1/2766; H02K 2213/03
IPC ....................................................... H02K 1/27
See application file for complete search history.

(56) References Cited

U.S. PATENT DOCUMENTS

| 8,878,410 B2* | 11/2014 | Utaka | H02K 1/2766 310/156.53 |
|---|---|---|---|
| 9,178,399 B2* | 11/2015 | Parviainen | H02K 1/223 |
| 9,312,731 B2* | 4/2016 | Takahashi | H02K 1/2706 |
| 2008/0093944 A1* | 4/2008 | Takahashi | H02K 1/2766 310/156.02 |
| 2011/0241468 A1 | 10/2011 | Inagaki et al. | |

(Continued)

FOREIGN PATENT DOCUMENTS

| JP | 2000-278896 | 10/2000 |
|---|---|---|
| JP | 2004-88846 | 3/2004 |

(Continued)

OTHER PUBLICATIONS

Office Action (2 pgs.) dated Oct. 28, 2014 issued in corresponding Japanese Application No. 2012-242820 with an at least partial English-language translation thereof (2 pgs.).

*Primary Examiner* — John K Kim
(74) *Attorney, Agent, or Firm* — Nixon & Vanderhye P.C.

(57) ABSTRACT

A rotor includes a rotor core having a plurality of pairs of magnet-receiving holes and a plurality of magnets respectively received in the magnet-receiving holes. Each pair of the magnet-receiving holes is arranged in a substantially V-shape that opens toward a stator side. The rotor core also has a plurality of q-axis core portions through which q-axis magnetic flux flows, a plurality of first magnetic flux barriers and a plurality of second magnetic flux barriers. Further, in the rotor core, the following dimensional relationships are satisfied: W2≥W1; and W3≥W1, where W1 is a width between centerlines L1 of the q-axis core portions and the corresponding first magnetic flux barriers, W2 is a width between the centerlines L1 and the corresponding second magnetic flux barriers, and W3 is a radial width between a radially inner surface of the rotor core and the second magnetic flux barriers.

5 Claims, 5 Drawing Sheets

(56) References Cited

U.S. PATENT DOCUMENTS

| | | | |
|---|---|---|---|
| 2011/0278977 A1* | 11/2011 | Utaka | H02K 1/2766 310/156.53 |
| 2012/0139378 A1* | 6/2012 | Endo | H02K 1/2766 310/156.21 |
| 2012/0321932 A1 | 12/2012 | Ise et al. | |
| 2013/0147299 A1* | 6/2013 | Rahman | H02K 1/2706 310/156.01 |
| 2014/0125182 A1* | 5/2014 | Takahashi | H02K 1/2766 310/156.11 |

FOREIGN PATENT DOCUMENTS

| | | |
|---|---|---|
| JP | 2011-165481 | 8/2011 |
| JP | 2011-211860 | 10/2011 |
| JP | 2012-34432 | 2/2012 |

\* cited by examiner

ROTOR FOR ROTATING ELECTRIC MACHINE

CROSS-REFERENCE TO RELATED APPLICATION

This application is based on and claims priority from Japanese Patent Application No. 2012-242820, filed on Nov. 2, 2012, the content of which is hereby incorporated by reference in its entirety into this application.

BACKGROUND

1. Technical Field

The present invention relates to rotors for rotating electric machines that are used in, for example, motor vehicles as electric motors and electric generators.

2. Description of Related Art

There are known IPM (Interior Permanent Magnet) motors that have permanent magnets embedded in a rotor core. The IPM motors can use both reluctance torque and magnetic toque, thereby achieving high efficiency. Therefore, the IPM motors are particularly suitable for use in hybrid and electric vehicles.

An IPM motor generally includes a stator and a rotor that is disposed in radial opposition to the stator. The rotor includes a rotor core and a plurality of permanent magnets. The rotor core has a plurality of pairs of magnet-receiving holes formed therein. Each pair of the magnet-receiving holes is arranged in a substantially V-shape that opens toward the stator side. Each of the permanent magnets is received in a corresponding one of the magnet-receiving holes of the rotor core. Further, for each pair of the magnet-receiving holes, the two corresponding permanent magnets which are respectively received in the two magnet-receiving holes of the pair are arranged so as to together form one magnetic pole of the rotor. In addition, for each pair of the magnet-receiving holes, there is formed a corresponding center bridge that extends in a radial direction of the rotor core between the two magnet-receiving holes of the pair to separate them from each other.

Moreover, magnetic flux leakage via the center bridges can be reduced, for example as disclosed in Patent Document 1 (i.e., Japanese Unexamined Patent Application Publication No. 2000-278896), by suitably designing magnetic flux barriers at opposite ends of each magnetic pole of the rotor.

On the other hand, Patent Document 2 (i.e., Japanese Unexamined Patent Application Publication No. 2011-211860) discloses a technique of providing relatively large magnetic flux barriers each of which extends from a magnetic pole centerline-side end of a corresponding one of the magnet-receiving holes of the rotor core toward a longitudinal axis of the rotor core, thereby reducing magnetic flux leakage toward the longitudinal axis. Moreover, by providing the relatively large magnetic flux barriers in the rotor core, it is possible to reduce the weight and thus the inertia of the rotor core. In addition, the magnetic flux barriers are arranged in pairs each of which corresponds to one pair of the magnetic-receiving holes of the rotor core.

However, according to the disclosure of Patent Document 2, for each pair of the magnetic flux barriers, the corresponding center bridge, which radially extends between the two magnetic flux barriers of the pair, has an internal barrier formed therein and is thus circumferentially divided by the internal barrier into two parts. Consequently, the total circumferential width of the corresponding center bridge is increased by the circumferential width of the internal barrier; thus it becomes necessary to offset the pair of permanent magnets received in the corresponding pair of the magnet-receiving holes of the rotor core circumferentially outward.

Further, with the circumferentially-outward offset of the permanent magnets, the circumferential width of q-axis core portions of the rotor core is accordingly reduced. Here, the q-axis core portions denote those portions of the rotor core each of which is formed between one circumferentially-adjacent pair of the magnetic poles of the rotor and through which q-axis magnetic flux flows. Moreover, the circumferential width of bridges that are formed between stator-side core portions of the rotor core and the q-axis core portions is also reduced; the stator-side core portions are located on the stator side of the magnet-receiving holes of the rotor core.

Consequently, with the reduced circumferential width of the q-axis core portions, the amount of q-axis magnetic flux which is allowed to flow through the q-axis core portions is also reduced, thereby lowering the output torque of the rotating electric machine. Moreover, with the reduced circumferential width of the bridges formed between the stator-side core portions and the q-axis core portions, it becomes easy for a magnetic short circuit to be formed within the rotor via the bridges, thereby reducing the amount of magnetic flux transferred between the rotor and the stator.

SUMMARY

According to an exemplary embodiment, a rotor for a rotating electric machine is provided which includes a hollow cylindrical rotor core and a plurality of magnets. The rotor core is configured to be disposed in radial opposition to a stator of the rotating electric machine. The rotor core has a longitudinal axis and a plurality of pairs of magnet-receiving holes formed therein. Each pair of the magnet-receiving holes is arranged in a substantially V-shape that opens toward the stator side. Each of the magnets is received in a corresponding one of the magnet-receiving holes of the rotor core. For each pair of the magnet-receiving holes of the rotor core, the two corresponding magnets which are respectively received in the two magnet-receiving holes of the pair are arranged so as to together form one magnetic pole of the rotor. The magnetic pole has a centerline C1 that radially extends to bisect the magnetic pole in a circumferential direction of the rotor core. The rotor core further has a plurality of q-axis core portions through which q-axis magnetic flux flows, a plurality of first magnetic flux barriers and a plurality of second magnetic flux barriers. Each of the q-axis core portions is formed between one circumferentially-adjacent pair of the magnetic poles of the rotor and has a centerline L1 that radially extends to bisect the q-axis core portion in the circumferential direction of the rotor core. Each of the first magnetic flux barriers is formed between a corresponding one of the q-axis core portions of the rotor core and a corresponding one of the magnets that are respectively received in the corresponding magnet-receiving holes of the rotor core. Each of the second magnetic flux barriers is formed so as to extend from a centerline C1-side end of a corresponding one of the magnet-receiving holes of the rotor core toward the longitudinal axis of the rotor core. In the rotor core, the following dimensional relationships are satisfied: $W2 \geq W1$; and $W3 \geq W1$, where $W1$ is a width between the centerlines $L1$ of the q-axis core portions and the corresponding first magnetic flux barriers, $W2$ is a width between the centerlines $L1$ of the q-axis core portions and the corresponding second magnetic flux barriers, and W3 is a radial width between a radially inner surface of the rotor core and the second magnetic flux barriers.

Consequently, with W2 and W3 being not less than W1, q-axis magnetic flux, which has flowed through those parts of the rotor core which define the width W1, can also reliably flow through those parts of the rotor core which define the width W2 and the radial width W3 without leaking therefrom. As a result, it is possible to prevent the performance of the rotating electric machine from being lowered due to leakage of q-axis magnetic flux.

It is preferable that in the rotor, a ratio $(\alpha/2)/\theta$ is set to be greater than or equal to 9%, where $\alpha$ is the angular width of each of the q-axis core portions of the rotor core, and $\theta$ is the angular width of each of the magnetic poles of the rotor.

In a further implementation, each of the second magnetic flux barriers is formed to have a protruding portion that protrudes toward the stator side from the magnet received in the corresponding one of the magnet-receiving holes of the rotor core. Further, a protruding height H of the protruding portion from the magnet is set to be in the following range: $0.12 \times R \leq H \leq 0.29 \times R$, where R is a minimum distance from an intersection P1, which is between the centerline C1 of the magnetic pole and a rotor-side circumferential surface of the stator, to a stator-side wall surface of the corresponding magnet-receiving hole of the rotor core.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
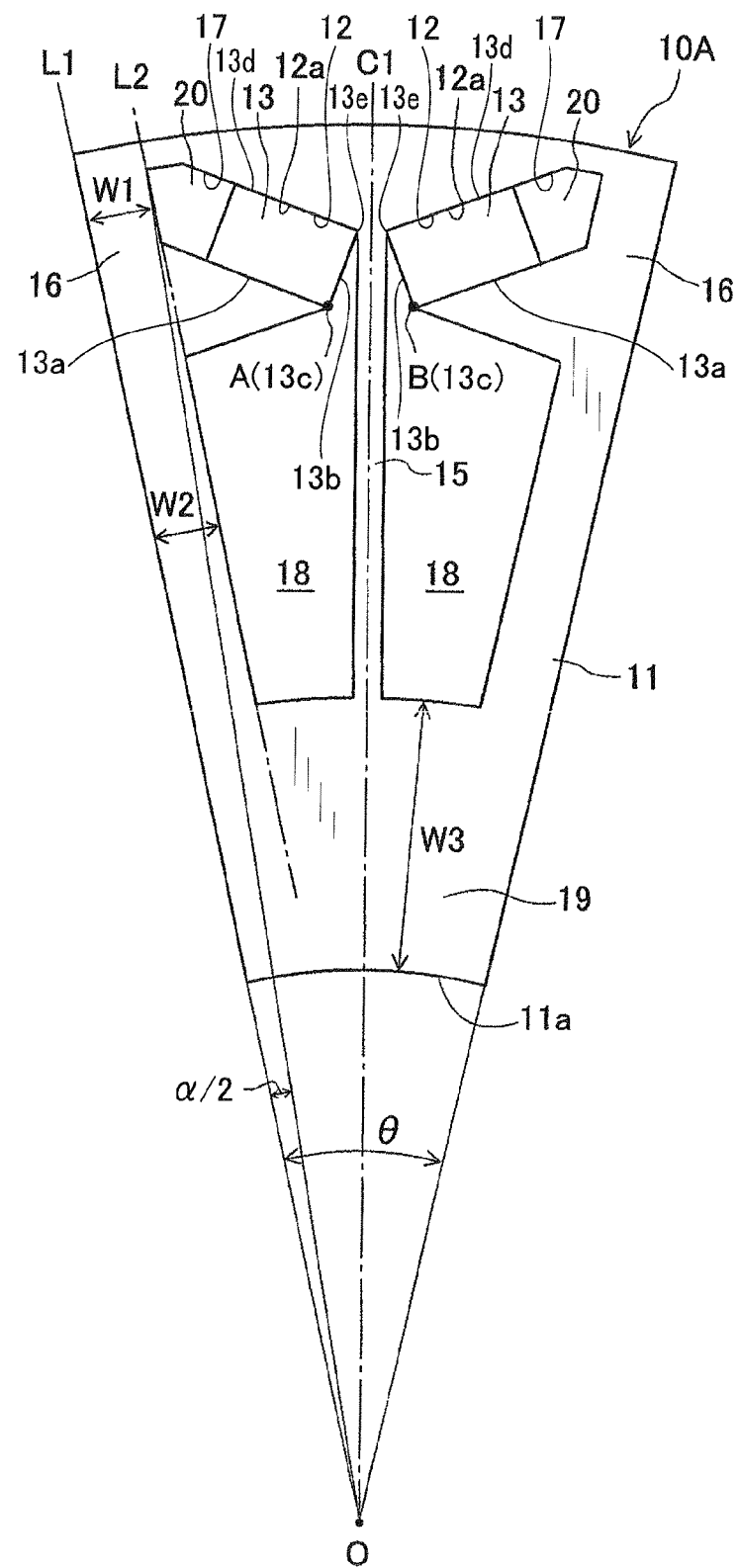
FIG. 1 is an axial view of a portion of a rotor according to a first embodiment, the portion making up one magnetic pole of the rotor.

Exemplary embodiments will be described hereinafter with reference to FIGS. 1-8. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

[First Embodiment]

FIG. 1 shows the overall configuration of a rotor 10A according to a first embodiment.

In the present embodiment, the rotor 10A is designed to be used in, for example, an electric motor (not shown) for a motor vehicle. The motor includes, in addition to the rotor 10A, a housing, a stator and a rotating shaft, all of which are not shown in FIG. 1. The housing is configured to receive both the rotor 10A and the stator therein such that the rotor 10A is disposed radially inside the stator with a predetermined air gap formed between a radially outer periphery of the rotor 10A and a radially inner periphery of the stator. That is to say, the motor is of an inner rotor type. The rotating shaft is rotatably supported at opposite ends thereof by the housing via a pair of bearings (not shown). The rotor 10A is configured to be fixedly fitted on the rotating shaft so as to rotate along with the rotating shaft.

As shown in FIG. 1, the rotor 10A includes a rotor core 11 and a plurality of permanent magnets 13 embedded in the rotor core 11. That is to say, in the present embodiment, the rotor 10A is configured as an Interior Permanent Magnet (IPM) rotor.

The rotor core 11 is formed, by axially laminating a plurality of annular magnetic steel sheets, into a hollow cylindrical shape. Consequently, at the radial center of the rotor core 11, there is formed a through-hole 11a, in which the rotating shaft is to be fixedly fitted so as to rotate together with the rotor core 11.

The permanent magnets 13 are embedded in the rotor core 11 so as to form a plurality of magnetic poles of the rotor 10A on the radially outer periphery of the rotor core 11. The magnetic poles are equally spaced in the circumferential direction of the rotor core 11 at predetermined intervals so that the polarities of the magnetic poles alternate between north and south in the circumferential direction. In addition, in the present embodiment, the number of the magnetic poles of the rotor 10A is equal to, for example, 12 (i.e., 6 north poles and 6 south poles).

More specifically, in the present embodiment, the rotor core 11 has a plurality (e.g., 12) of pairs of magnet-receiving holes 12 formed in the vicinity of the radially outer periphery of the rotor core 11. Each of the magnet-receiving holes 12 extends in the axial direction of the rotor core 11 so as to penetrate the rotor core 11 in the axial direction. Further, each of the magnet-receiving holes 12 has a cross section perpendicular to a longitudinal axis O of the rotor core 11, the shape of which is basically a rectangle.

In addition, it should be noted that though there is shown only one pair of the magnet-receiving holes 12 in FIG. 1, the plurality of pairs of the magnet-receiving holes 12 are equally spaced in the circumferential direction of the rotor core 11 at predetermined intervals.

Moreover, in the present embodiment, each pair of the magnet-receiving holes 12 is arranged so as to form a substantially V-shape that opens toward the radially outer periphery of the rotor core 11. Further, for each pair of the magnet-receiving holes 12, there is formed a corresponding center bridge 15 of the rotor core 11 which extends in a radial direction of the rotor core 11 at a substantially constant width so as to separate the two magnet-receiving holes 12 of the pair from each other. The corresponding center bridge 15 is provided for causing magnetic flux saturation and thereby impeding formation of a magnetic circuit between the two magnet-receiving holes 12.

Furthermore, for each pair of the magnet-receiving holes 12, the two magnet-receiving holes 12 of the pair are symmetrically formed with respect to the corresponding center bridge 15; the width directions of the two magnet-receiving holes 12 respectively coincide with the extending directions of the two sides of the substantially V-shape formed by the two magnet-receiving holes 12. In addition, both the longitudinal directions of the two magnet-receiving holes 12 are parallel to the longitudinal axis O of the rotor core 11.

Each of the permanent magnets 13 is inserted in a corresponding one of the magnet-receiving holes 12 of the rotor core 11 so as to extend in the axial direction of the rotor core 11. Further, each of the permanent magnets 13 has a substantially rectangular cross section perpendicular to the axial direction of the rotor core 11 (i.e., the direction of the longitudinal axis O of the rotor core 11). That is to say, in the present embodiment, each of the permanent magnets 13 has a substantially cuboid shape.

Moreover, for each pair of the magnet-receiving holes 12 of the rotor core 11, the two permanent magnets 13 which are respectively inserted in the two magnet-receiving holes 12 of the pair are arranged so that the polarities (north or south) of the two permanent magnets 13 are the same on the radially outer periphery of the rotor core 11. Consequently, the two permanent magnets 13 together form one of the magnetic poles of the rotor 10A on the radially outer periphery of the rotor core 11. In addition, as shown in FIG. 1, when viewed along the axial direction of the rotor core 11, the two permanent magnets 13 are symmetrically arranged and extend obliquely with respect to a centerline C1 of the magnetic pole; the centerline C1 extends in the radial direction, along which the corresponding center bridge 15 of the rotor core 11 is formed, and bisects the magnetic pole in the circumferential direction of the rotor core 11. Consequently, the two permanent magnets 13 also together form a substantially V-shape that opens radially outward (i.e., toward the radially outer periphery of the rotor core 11).

Furthermore, in each of the magnet-receiving holes 12 of the rotor core 11, the corresponding permanent magnet 13 is positioned such that a corner portion 13$e$ of the corresponding permanent magnet 13 abuts a radially-outer root portion of the corresponding center bridge 15; the corner portion 13$e$ is formed between a radially-outer side surface 13$d$ and a centerline C1-side side surface 13$b$ of the corresponding permanent magnet 13.

Moreover, the rotor core 11 has a plurality of q-axis core portions 16 through which q-axis magnetic flux flows. Each of the q-axis core portions 16 is formed between a corresponding one circumferentially-adjacent pair of the magnetic poles of the rotor 10A. Further, for each of the magnet-receiving holes 12 of the rotor core 11, there is provided a first magnetic flux barrier (or magnetic void) 17 between the corresponding permanent magnet 13 received in the magnet-receiving hole 12 and the corresponding q-axis core portion 16 adjacent to the magnet-receiving hole 12. In other words, the first magnetic flux barrier 17 is provided on the corresponding q-axis core portion 16 side of the magnet-receiving hole 12. Furthermore, a circumferentially-outer end of the first magnetic flux barrier 17 is located to define a width (or minimum distance) W1 between a centerline L1 of the corresponding q-axis core portion 16 and the first magnetic flux barrier 17; the centerline L1 extends in a radial direction of the rotor core 11 and bisects the corresponding q-axis core portion 16 in the circumferential direction of the rotor core 11. In addition, in the present embodiment, the circumferentially-outer end of the first magnetic flux barrier 17 extends along a straight line L2 that is parallel to the centerline L1 of the corresponding q-axis core portion 16 and distant from the centerline L1 by the width W1.

In the present embodiment, a ratio $(\alpha/2)/\theta$ is set to be greater than or equal to 9%. Here, $\alpha$ is the angular width of each of the q-axis core portions 16 of the rotor core 11, and $\theta$ is the angular width of each of the magnetic poles of the rotor 10A (i.e., the quotient of the entire angular width 360° of the rotor 10A divided by the number of the magnetic poles of the rotor 10A). In addition, the above range of the ratio $(\alpha/2)/\theta$ is set based on the results of Experiment 2 which will be described later.

Moreover, each of the permanent magnets 13 is fixedly held in the corresponding magnet-receiving hole 12 of the rotor core 11 by a filler 20 that is filled in the gaps between the permanent magnet 13 and the radially-outer and radially-inner wall surfaces of the corresponding magnet-receiving hole 12 as well as in the corresponding first magnetic flux barrier 17. In addition, the filler 20 is made of a nonmagnetic material, such as resin.

Furthermore, in the present embodiment, for each pair of the magnet-receiving holes 12 of the rotor core 11, there are provided a pair of second magnetic flux barriers 18 that respectively extend from centerline C1-side ends of the pair of the magnet-receiving holes 12 toward the longitudinal axis O of the rotor core 11. Further, the corresponding center bridge 15, which is formed between the pair of the magnet-receiving holes 12, is radially extended toward the longitudinal axis O of the rotor core 11 so as to also separate the pair of the second magnetic flux barriers 18 from each other. Moreover, the pair of the second magnetic flux barriers 18 extend on the longitudinal axis O side of an imaginary line segment A-B which connects two points A and B respectively on the corresponding permanent magnets 13 received in the pair of the magnet-receiving holes 12; the two points A and B are closest in the corresponding permanent magnets 13 to the longitudinal axis O. In addition, the two points A and B respectively fall on the corner portions 13$c$ formed between the radially-inner side surfaces 13$a$ and the centerline C1-side side surfaces 13$b$ of the corresponding permanent magnets 13.

More specifically, in the present embodiment, each of the second magnetic flux barriers 18 extends toward the longitudinal axis O of the rotor core 11 (or radially inward) to define a radial width W3 between the radially inner surface of the rotor core 11 and the second magnetic flux barrier 18. Here, the radially inner surface of the rotor core 11 is represented by the radially inner surface of an annular portion 19 of the rotor core 11 formed at the radially inner periphery of the rotor core 11; the radial width W3 is represented by the minimum distance from the radially inner surface of the annular portion 19 to the second magnetic flux barrier 18. In addition, the radial width W3 is set to be greater than or equal to the width W1 described above.

Moreover, in the present embodiment, each of the second magnetic flux barriers 18 extends circumferentially outward from the point A or B on the corresponding permanent magnet 13 to define a width (or minimum distance) W2 between the centerline L1 of the corresponding q-axis core portion 16 and the second magnetic flux barrier 18. In addition, the width W2 is set to be greater than or equal to the width W1. More particularly, in the present embodiment, the circumferentially-outer end of the second magnetic flux barrier 18 extends along the straight line L2, and thus the width W2 is equal to the width W1.

After having described the configuration of the rotor 10A according to the present embodiment, advantages thereof will be described hereinafter.

As described above, in the present embodiment, the rotor 10A includes the hollow cylindrical rotor core 11 and the permanent magnets 13. The rotor core 11 is configured to be disposed in radial opposition to the stator of the motor. The rotor core 11 has the longitudinal axis O and the plurality of pairs of the magnet-receiving holes 12 formed therein. Each pair of the magnet-receiving holes 12 is arranged in the substantially V-shape that opens toward the stator side. Each of the permanent magnets 13 is received in the corresponding one of the magnet-receiving holes 12 of the rotor core 11. For each pair of the magnet-receiving holes 12 of the rotor core 11, the two corresponding permanent magnets 13 which are respectively received in the two magnet-receiving holes 12 of the pair are arranged so as to together form one magnetic pole of the rotor 10A. The magnetic pole has the centerline C1 that radially extends to bisect the magnetic pole in the circumferential direction of the rotor core 11. The rotor core further has the q-axis core portions 16, the first magnetic flux barriers 17 and the second magnetic flux barriers 18. Each of the q-axis core portions 16 is formed between one circumferentially-adjacent pair of the magnetic poles of the rotor 10A and has the centerline L1 that radially extends to bisect the q-axis core portion 16 in the circumferential direction of the rotor core 11. Each of the first magnetic flux barriers 17 is formed between the corresponding one of the q-axis core portions 16 of the rotor core 11 and the corresponding one of the permanent magnets 13 that are respectively received in the corresponding magnet-receiving holes 12 of the rotor core 11. Each of the second magnetic flux barriers 18 is formed so as to extend from the centerline C1-side end of the corresponding one of the magnet-receiving holes 12 of the rotor core 11 toward the longitudinal axis O of the rotor core 11. Further, in the rotor core 11, the following dimensional relationships are satisfied: W2 ≥W1; and W3 ≥W1, where W1 is the width between the centerlines L1 of the q-axis core portions 16 and the corresponding first magnetic flux barriers 17, W2 is the width between the centerlines L1 of the q-axis core portions 16 and the corresponding second magnetic flux barriers 18, and W3 is the radial width between the radially inner surface of the rotor core 11 and the second magnetic flux barriers 18.

Consequently, with W2 and W3 being not less than W1, q-axis magnetic flux, which has flowed through those parts of the rotor core 11 which define the width W1, can also reliably flow through those parts of the rotor core 11 which define the width W2 and the radial width W3 without leaking therefrom. As a result, it is possible to prevent the output torque of the motor from being lowered due to leakage of q-axis magnetic flux.

Moreover, in the present embodiment, the ratio $(\alpha/2)/\theta$ is set to be greater than or equal to 9%, where $\alpha$ is the angular width of each of the q-axis core portions 16 of the rotor core 11, and $\theta$ is the angular width of each of the magnetic poles of the rotor 10A.

Setting the ratio $(\alpha/2)/\theta$ as above, it is possible to set the to width W1 to be sufficiently large, thereby allowing a sufficiently-large amount of q-axis magnetic flux to flow through those parts of the rotor core 11 which define the width W1. As a result, it is possible to prevent the output torque of the motor from being lowered due to an insufficient amount of q-axis magnetic flux flowing through the q-axis core portions 16 of the rotor core 11.

[Experiment 1]

This experiment has been conducted to determine the effect of the dimensional parameters W1, W2 and W3 in the rotor 10A according to the first embodiment on the output torque of the motor.

Specifically, in the experiment, a plurality of sample rotors were prepared, all of which had the same configuration as the rotor 10A according to the first embodiment. However, for those sample rotors, the differences (W2 −W1) and (W3 −W1) were varied in the range of −2 mm to +1 mm. Then, each of the sample rotors was tested to measure the output torque of the motor.

Figure 2:
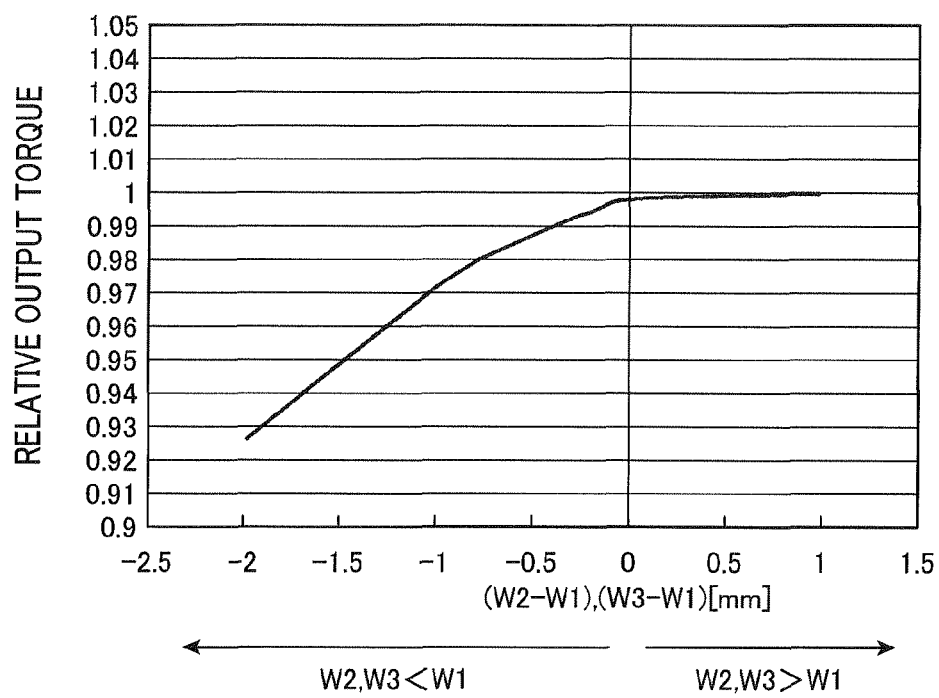
FIG. 2 is a graphical representation showing the relationship between parameters W1, W2 and W3, which are defined in a rotor core of the rotor, and the output torque of an electric motor which employs the rotor, the relationship having been determined by Experiment 1.

FIG. 2 shows the test results, where the vertical axis indicates the relative output torques which were obtained by dividing the actual output torques for the sample rotors by the actual output torque for that sample rotor in which both the differences (W2 −W1) and (W3 −W1) were equal to +1 mm.

As shown in FIG. 2, when both the differences (W2 −W1) and (W3 −W1) were increased above 0, the output torque of the motor was kept almost constant at the maximum value. In contrast, when both the differences (W2 −W1) and (W3 −W1) were decreased below 0, the output torque of the motor dropped rapidly.

Accordingly, from the test results shown in FIG. 2, it has been made clear that in terms of securing a high output torque of the motor, it is preferable to set (W2 −W1)≥0 (i.e., W2 ≥W1) and (W3 −W1) (i.e., W3 ≥W1).

[Experiment 2]

This experiment has been conducted to determine the effect of the ratio $(\alpha/2)/\theta$ in the rotor 10A according to the first embodiment on the reluctance torque of the motor.

Specifically, in the experiment, a plurality of sample rotors were prepared, all of which had the same configuration as the rotor 10A according to the first embodiment. However, for those sample rotors, the ratio $(\alpha/2)/\theta$ was varied in the range not less than 6%. Then, each of the sample rotors was tested to measure the reluctance torque of the motor.

Figure 3:
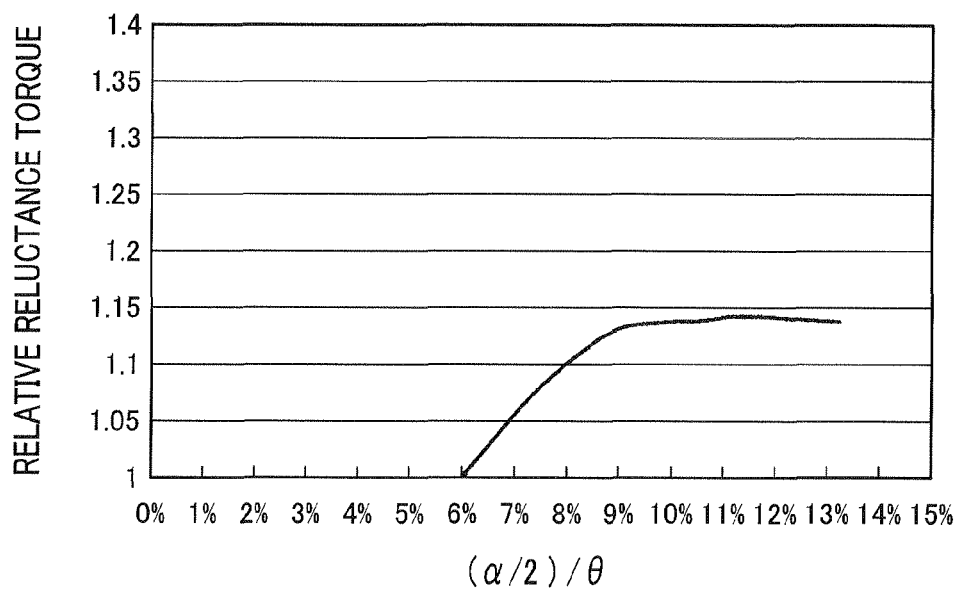
FIG. 3 is a graphical representation showing the relationship between a ratio $(\alpha/2)/\theta$ defined in the rotor and the reluctance torque of the motor, the relationship having been determined by Experiment 2.

FIG. 3 shows the test results, where the vertical axis indicates the relative reluctance torques which were obtained by dividing the actual reluctance torques for the sample rotors by the actual reluctance torque for that sample rotor in which the ratio $(\alpha/2)/\theta$ was equal to 6%.

As shown in FIG. 3, the reluctance torque of the motor was brought into a saturated state when the ratio $(\alpha/2)/\theta$ was increased above 9%.

Accordingly, from the test results shown in FIG. 3, it has been made clear that in terms of securing a high reluctance torque of the motor, it is preferable to set the ratio $(\alpha/2)/\theta$ to be greater than or equal to 9%.

[Second Embodiment]

This embodiment illustrates a rotor 10B which has almost the same configuration as the rotor 10A according to the first embodiment; accordingly, only the differences therebetween will be described hereinafter.

In the rotor 10A according to the first embodiment, each of the second magnetic flux barriers 18 is formed so as not to protrude radially outward (i.e., toward the stator side) from the permanent magnet 13 received in the corresponding one of the magnet-receiving holes 12 of the rotor core 11 (see FIG. 1).

Figure 4:
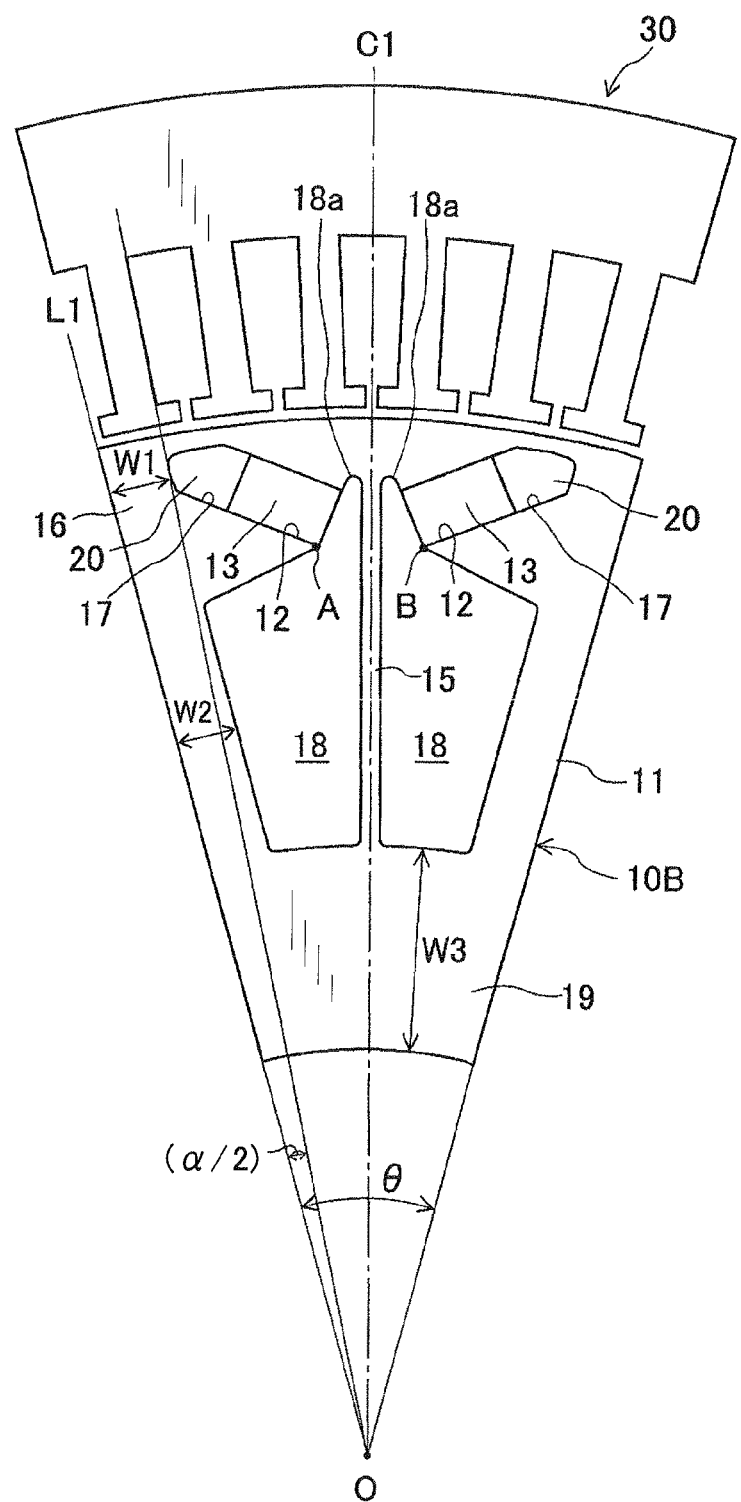
FIG. 4 is an axial view of a portion of a rotor according to a second embodiment, the portion making up one magnetic pole of the rotor.
Figure 5:
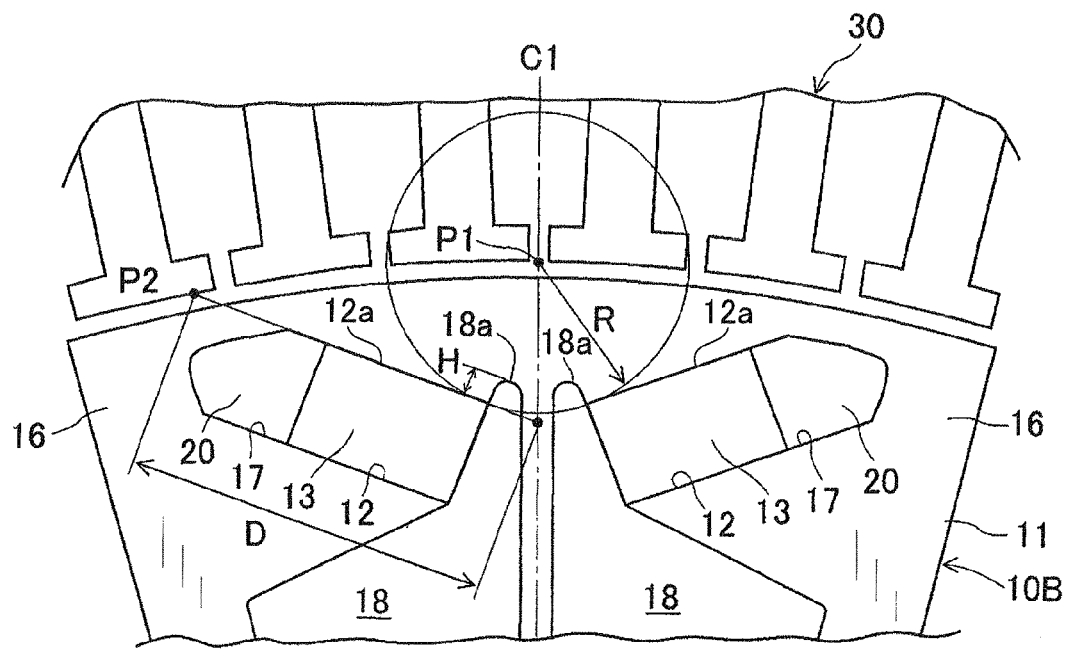
FIG. 5 is an enlarged view of part of FIG. 4.

In comparison, in the rotor 10B according to the present embodiment, as shown in FIGS. 4 and 5, each of the second magnetic flux barriers 18 is formed to have a protruding portion 18a that protrudes radially outward (i.e., toward the stator 30 side) from the permanent magnet 13 received in the corresponding one of the magnet-receiving holes 12 of the rotor core 11.

Further, in the present embodiment, referring to FIG. 5, the protruding height H of the protruding portion 18a from the permanent magnet 13 is set to be in the following range:

$$0.12 \times R \leq H \leq 0.29 \times R,$$

where R is the minimum distance from an intersection P1 between the centerline C1 of the magnetic pole and the radially inner surface (or the rotor-side circumferential surface) of the stator 30 to the radially-outer wall surface (or the stator-side wall surface) 12a of the corresponding magnet-receiving hole 12 of the rotor core 11. In addition, the minimum distance R is represented by the length of a straight line segment which extends perpendicular to the radially-outer wall surface 12a of the corresponding magnet-receiving hole 12 from the intersection P1 to the radially-outer wall surface 12a.

Setting the upper limit of the protruding height H to 0.29×R, it is possible to suppress decrease in the q-axis inductance in the area of the rotor core 11 on the radially outside (or on the stator side) of each pair of the magnet-receiving holes 12. Moreover, setting the lower limit of the protruding height H to 0.12×R, it is possible to enhance magnetic flux saturation occurring in the corresponding center bridge 15. Consequently, it is possible to reduce magnetic flux leakage via the corresponding center bridge 15, thereby increasing the amount of effective magnetic flux in the rotor 10B.

In addition, the rotor 10B according to the present embodiment has the same advantages as the rotor 10A according to the first embodiment.

[Experiment 3]

This experiment has been conducted to determine the optimal range of the protruding height H of the protruding portions 18a of the second magnetic flux barriers 18 in the rotor 10B according to the second embodiment.

Specifically, in the experiment, a plurality of sample rotors were prepared, all of which had the same configuration as the rotor 10B according to the second embodiment. However, for those sample rotors, the dimensional ratio H/R was varied in the range of 0 to 0.5. Here, R is the minimum distance as described in the second embodiment (see FIG. 5). Then, each of the sample rotors was tested to measure the q-axis inductance, the amount of effective magnetic flux and the torque of the motor.

Figure 6:
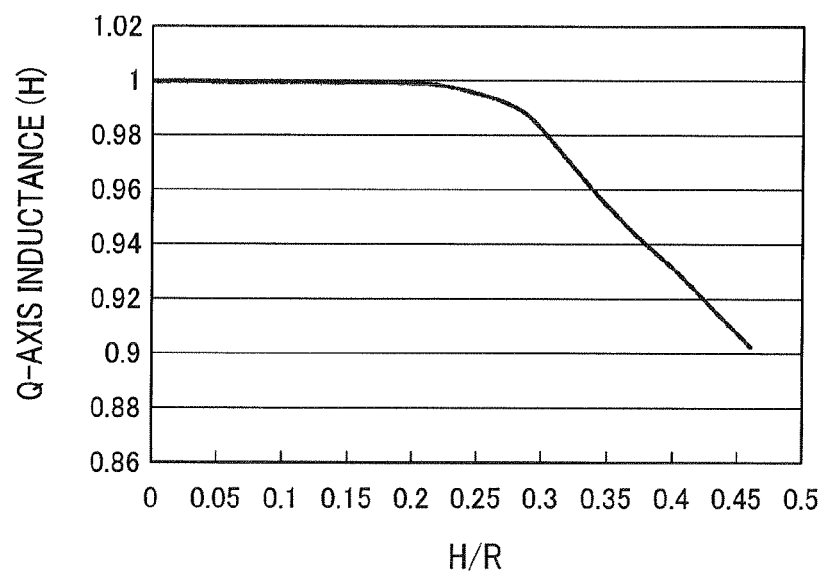
FIG. 6 is a graphical representation showing the relationship between a dimensional ratio H/R and the q-axis inductance in the rotor according to the second embodiment, the relationship having been determined by Experiment 3.
Figure 7:
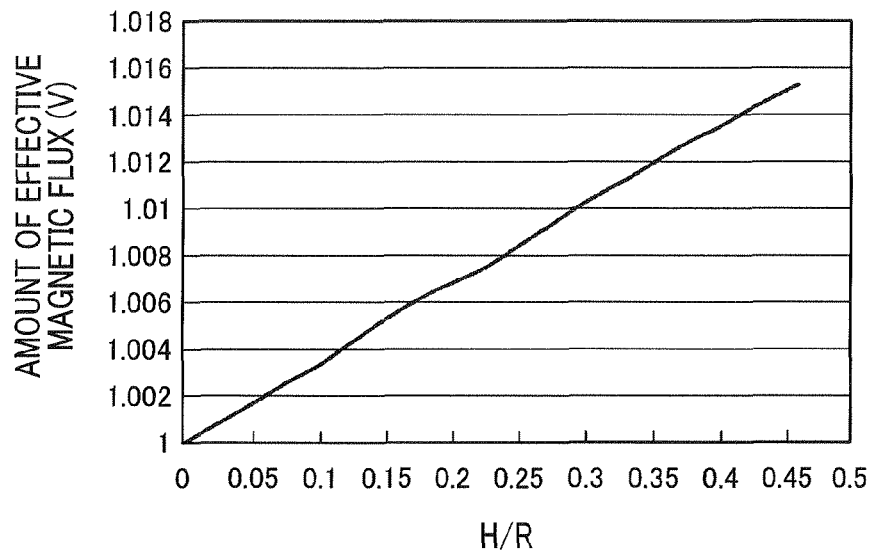
FIG. 7 is a graphical representation showing the relationship between the dimensional ratio H/R and the amount of effective magnetic flux in the rotor according to the second embodiment, the relationship having been determined by Experiment 3.
Figure 8:
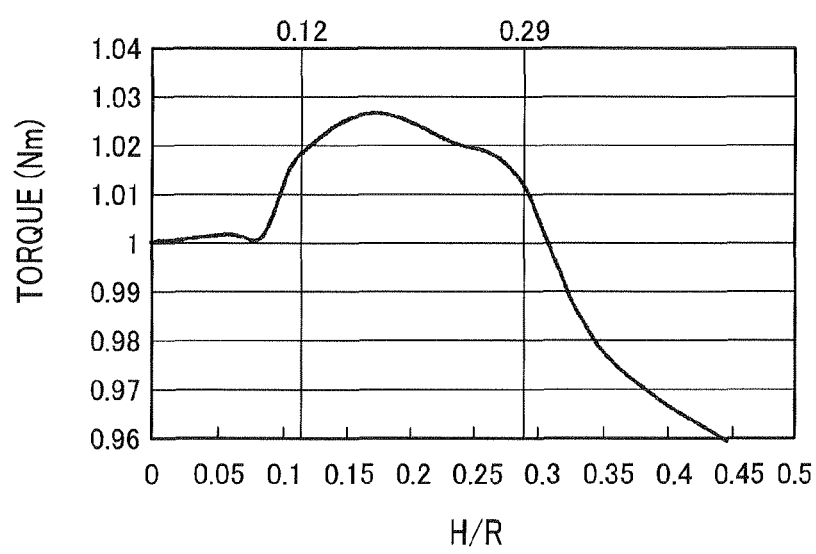
FIG. 8 is a graphical representation showing the relationship between the dimensional ratio H/R and the output torque of an electric motor which employs the rotor according to the second embodiment, the relationship having been determined by Experiment 3.

FIG. 6 shows the change in the measured q-axis inductance with the dimensional ratio H/R. FIG. 7 shows the change in the measured amount of effective magnetic flux with the dimensional ratio H/R. FIG. 8 shows the change in the measured torque of the motor with the dimensional ratio H/R.

In addition, in this experiment, the amount of effective magnetic flux was measured by measuring the back electromotive force induced in the stator 30. Therefore, the amount of effective magnetic flux is shown in the unit of "V" instead of "Wb" in FIG. 7.

As shown in FIG. 6, the q-axis inductance rapidly dropped when the dimensional ratio H/R had increased to exceed 0.29. Moreover, as shown in FIG. 7, the amount of effective magnetic flux linearly increased in proportion to the dimensional ratio H/R. Furthermore, as shown in FIG. 8, the torque of the motor was higher than or equal to 1.01 when the dimensional ratio H/R was in the range of 0.12 to 0.29.

Accordingly, from the test results shown in FIGS. 6-8, it has been made clear that the optimal range of the protruding height H is from 0.12×R to 0.29×R.

While the above particular embodiments have been shown and described, it will be understood by those skilled in the art that various modifications, changes, and improvements may be made without departing from the spirit of the present invention.

For example, in the previous embodiments, the rotors 10A and 10B have the permanent magnets 13 respectively received in the corresponding magnet-receiving holes 12 of the rotor core 11. However, the rotors 10A and 10B may also have, instead of the permanent magnets 13, a plurality of grain boundary diffusion magnets respectively received in the corresponding magnet-receiving holes 12 of the rotor core 11. The grain boundary diffusion magnets have their coercivity enhanced only at the outer surfaces thereof by using, for example, terbium (Tb).

In the previous embodiments, the invention is directed to the rotors 10A and 10B for the inner rotor-type motors. However, the invention can also be applied to a rotor for an outer rotor-type rotating electric machine in which the rotor is disposed radially outside of a stator of the machine.

Moreover, in the previous embodiments, the invention is directed to the rotors 10A and 10B for the vehicular motors. However, the invention can also be applied to a rotor for an electric generator or a rotor for a motor generator that can selectively function either as an electric motor or as an electric generator.

What is claimed is:

1. A rotor for a rotating electric machine, the rotor comprising:
    a hollow cylindrical rotor core configured to be disposed in radial opposition to a stator of the rotating electric machine, the rotor core having a longitudinal axis and a plurality of pairs of magnet-receiving holes formed therein, each pair of the magnet-receiving holes being arranged in a substantially V-shape that opens toward the stator side; and
    a plurality of magnets each of which is received in a corresponding one of the magnet-receiving holes of the rotor core,
    wherein
    for each pair of the magnet-receiving holes of the rotor core, the two corresponding magnets which are respectively received in the two magnet-receiving holes of the pair are arranged so as to together form one magnetic pole of the rotor, the magnetic pole having a centerline C1 that radially extends to bisect the magnetic pole in a circumferential direction of the rotor core,
    the rotor core further has a plurality of q-axis core portions through which q-axis magnetic flux flows, a plurality of first magnetic flux barriers and a plurality of second magnetic flux barriers,
    each of the q-axis core portions is formed between one circumferentially-adjacent pair of the magnetic poles of the rotor and has a centerline L1 that radially extends to bisect the q-axis core portion in the circumferential direction of the rotor core,
    each of the first magnetic flux barriers is formed between a corresponding one of the q-axis core portions of the rotor core and a corresponding one of the magnets that are respectively received in the corresponding magnet-receiving holes of the rotor core, each of the second magnetic flux barriers is formed so as to extend from a centerline C1-side end of a corresponding one of the magnet-receiving holes of the rotor core toward the longitudinal axis of the rotor core, in the rotor core, the following dimensional relationships are satisfied:

$W2 \geq W1$; and $W3 \geq W1$, where W1 is a width between the centerlines L1 of the q-axis core portions and the corresponding first magnetic flux barriers, W2 is a width between the centerlines L1 of the q-axis core portions and the corresponding second magnetic flux barriers, and W3 is a radial width between a radially inner surface of the rotor core and the second magnetic flux barriers, and each of the second magnetic flux barriers also extends from a point on the corresponding magnet received in the corresponding magnet-receiving hole of the rotor core in the circumferential direction away from the centerline C1 of the magnetic pole beyond a radially inner q-axis core portion-side end of the corresponding magnet, the point being closest in the corresponding magnet to the longitudinal axis of the rotor core.

2. The rotor as set forth in claim 1, wherein each of the second magnetic flux barriers is formed to have a protruding portion that protrudes toward the stator side from the magnet received in the corresponding one of the magnet-receiving holes of the rotor core, and a protruding height H of the protruding portion from the magnet is set to be in the following range:

$0.12 \times R \leq H \leq 0.29 \times R$, where R is a minimum distance from an intersection P1, which is between the centerline C1 of the magnetic pole and a rotor-side circumferential surface of the stator, to a stator-side wall surface of the corresponding magnet-receiving hole of the rotor core.

3. The rotor as set forth in claim 1, wherein:

for each pair of the magnet-receiving holes of the rotor core, there is formed corresponding center bridge of the rotor core which radially extends between the two magnet-receiving holes of the pair to separate them from each other, and in each of the magnet-receiving holes of the rotor core, the corresponding magnet is positioned such that a corner portion of the corresponding magnet abuts a radially-outer root portion of the corresponding center bridge, the corner portion being formed between a radially-outer side surface and a centerline C1-side side surface of the corresponding magnet.

4. The rotor as set forth in claim 1, wherein:

the second magnetic flux barriers extend toward the longitudinal axis of the rotor core such that a radially inward surface of each of the second magnetic flux barriers is closer to the radially inward surface of the rotor core than to the radially outward surface of the rotor core.

5. A rotor for a rotating; electric machine, the rotor comprising:

a hollow cylindrical rotor core configured to be disposed in radial opposition to a stator Of the rotating electric machine, the rotor core having a longitudinal axis and a plurality of pairs, Of magnet-receiving holes formed therein, each pair of the magnet-receiving holes being arranged in a substantially V-shape that opens toward the stator side; and a plurality of magnets each of which is received in a corresponding one of the magnet-receiving holes of the rotor core, wherein for each pair of the magnet-receiving holes of the rotor core, the two corresponding magnets which are respectively received in the two magnet-receiving holes of the pair are arranged so as to together form one magnetic pole of the rotor, the magnetic pole having a centerline C1 that radially extends to bisect the magnetic pole in a circumferential direction of the rotor core, the rotor core further has a plurality of q-axis core portions through which q-axis magnetic flux flows, a plurality of first magnetic flux barriers and a plurality of second magnetic flux barriers, each of the q-axis core portions is formed between one circumferentially-adjacent pair of the magnetic poles of the rotor and has a centerline L1 that radially extends to bisect the q-axis core portion in the circumferential direction of the rotor core, each of the first magnetic flux barriers is formed between a corresponding one of the q-axis core portions of the rotor core and a corresponding one of the magnets that are respectively received in the corresponding magnet-receiving holes of the rotor core, each of the second magnetic flux barriers is formed so as to extend from a centerline C1-side end of a corresponding one of the magnet-receiving holes of the rotor core toward the longitudinal axis of the rotor core, in the rotor core, the following dimensional relationships are satisfied:

$W2 \geq W1$; and $W3 \geq W1$, where W1 is a width between the centerlines L1 of the q-axis core portions and the corresponding first magnetic flux barriers, W2 is a width between the centerlines L1 of the q-axis core portions and the corresponding second magnetic flux barriers, and W3 is a radial width between a radially inner surface of the rotor core and the second magnetic flux barriers, each of the second magnetic flux barriers also extends from a point on the corresponding magnet received in the corresponding magnet-receiving hole of the rotor core in the circumferential direction away from the centerline C1 of the magnetic pole beyond a radially inner q-axis core portion-side end of the corresponding magnet, the point being closest in the corresponding magnet to the longitudinal axis of the rotor core; and a ratio $(\alpha/2)/\theta$ is set to be greater than or equal to 9%, where $\alpha$ is the angular width of each of the q-axis core portions of the rotor core, and $\theta$ is the angular width of each of the magnetic poles of the rotor.

* * * * *